O. ASHTON.
ASSEMBLING MACHINE.
APPLICATION FILED JULY 11, 1912.

1,204,928.

Patented Nov. 14, 1916.
7 SHEETS—SHEET 1.

Fig.1.

WITNESSES.
Elizabeth C. Coxe
Bertha A. Underwood

INVENTOR.

O. ASHTON.
ASSEMBLING MACHINE.
APPLICATION FILED JULY 11, 1912.

1,204,928.

Patented Nov. 14, 1916.
7 SHEETS—SHEET 6.

WITNESSES.
Elizabeth C. Coupe
Bertha F. Underwood

INVENTOR.
Orrell Ashton
By his Attorney
Nelson W. Howard

UNITED STATES PATENT OFFICE.

ORRELL ASHTON, OF SWAMPSCOTT, MASSACHUSETTS, ASSIGNOR TO UNITED SHOE MACHINERY COMPANY, OF PATERSON, NEW JERSEY, A CORPORATION OF NEW JERSEY.

ASSEMBLING-MACHINE.

1,204,928.   Specification of Letters Patent.   Patented Nov. 14, 1916.

Application filed July 11, 1912. Serial No. 708,848.

*To all whom it may concern:*

Be it known that I, ORRELL ASHTON, a citizen of the United States, residing at Swampscott, in the county of Essex and State of Massachusetts, have invented certain Improvements in Assembling-Machines, of which the following description, in connection with the accompanying drawings, is a specification, like reference characters on the drawings indicating like parts in the several figures.

This invention relates to machines for assembling parts of boots and shoes.

The invention is herein shown and described as embodied in a machine of the type described in United States Letters Patent No. 1,026,940, granted May 21, 1912. It will be understood, however, that the invention is not restricted in all its features to embodiment in a machine of the particular type described in the said patent. The machine of the said patent has provision for inserting a fastening in the rear face of a last, at a point removed from the sole, for the purpose of securing a shoe upper to the last. The machine also includes devices for wiping the upper over the edge of the last and for pressing the upper into close engagement with the last adjacent to the sole, and means for securing the wiped-over upper to an insole mounted upon the last. It is very desirable that the upper be smoothed out and drawn closely to the form of the rear face of the last before being secured thereto, since the appearance of the shoe and, particularly in the case of a low shoe, its fit and comfort are largely dependent upon its shape at the heel end.

An important feature of the invention accordingly consists in the provision, in a machine for operating upon the upper at the heel end of a shoe, of means, operating toward the cone of the last, to place the upper under tension. The preferable arrangement of mechanism comprises a wiper which moves downward in engagement with the rear face of the shoe simultaneously with the forward movement of the devices previously referred to, which wipe the upper over the edge of the last. By the action of such mechanism the upper is smoothed out and pressed closely into conformity with the last. It is not essential that the oppositely acting tensioning devices operate simultaneously; they may be timed to act successively, each performing its function while the work is held by the other or is held by other suitable means.

It is frequently desirable to secure the shoe upper to the last at the heel end of the shoe by a plurality of fastenings inserted through the rear face of the upper at different points in its height. It is necessary, for good results, that the work be very close to or in actual engagement with the fastening inserting mechanism, a condition which is difficult to bring about when the said mechanism consists of vertically spaced, stationary tackers, since the sizes and vertical curvatures of the rear ends of lasts are so various that an arrangement that would fit one last would be totally unsuitable for another.

Another feature of the present invention, therefore, consists in fastening inserting mechanism constructed for adjustment to various sizes and styles of lasts.

It is preferable that the adjustment be automatically effected and, in the embodiment of the invention hereinafter described, the mechanism comprises separately movable tacking devices coöperating with an equalizing lever so that they automatically adjust themselves to the curvature of the face of the shoe brought into engagement with them. Provision is also made for varying the spacing between the fastenings for lasts of different heights and the provision of means for drawing the work firmly into engagement with the tacking devices and locking it in this position during their operation is also contemplated as a feature of the invention.

A further object is to provide for the correct vertical location of the shoe relative to the various operating devices. This is best done by reference to the sole and a stop is therefore provided, against which the sole may be positioned. Means, comprising a system of levers or an equivalent coöperating with the shoe supporting jack, is provided for raising the jack automatically as it is moved inward and for pressing the sole yieldingly against the stop. It is also preferred to lock the jack against depression during the further operation of the machine although this is not indispensable. In the illustrative machine herein described the locking is automatically accomplished by a pawl and ratchet mechanism under the control of the power mechanism of the machine.

In the present machine the wiper which operates toward the cone of the last has combined with it a tack driving mechanism. When such a construction is employed, it is particularly desirable that the return movement of the wiper shall not occur until after the removal of the shoe, since the tack is only driven part way into the work and return movement of the tack block in engagement with the shoe would bend the tack or pull it out.

Another feature of the invention, accordingly, comprises a wiper which is power operated for forward wiping movement and which has its return movement under the control of the work support so that the return movement of the wiper does not take place until after the work has been removed.

Another feature of the invention consists in a reciprocating wiper and means coöperating with the wiper to effect pulling of the upper ahead of the wiping face of the wiper as the wiper is advanced. As shown, a reciprocating wiper is provided which moves horizontally over the work, and means is located in front of the wiper which coöperates with the end face of the wiper in seizing the flange of upper projecting above the wiping plane. Preferably relative separation of the wiper and the seizing means is effected when the wiper is retracted to permit insertion of the upper, the seizing means being rendered effective to seize the upper as the wiper advances and acting to pull the upper ahead of the wiping face of the wiper.

Other features of the invention, including details of construction and combinations of parts, will be hereinafter described and defined in the appended claims.

In the drawings, which illustrate a machine constituting one embodiment of the invention.

Figures 5, 6, 7, 8:
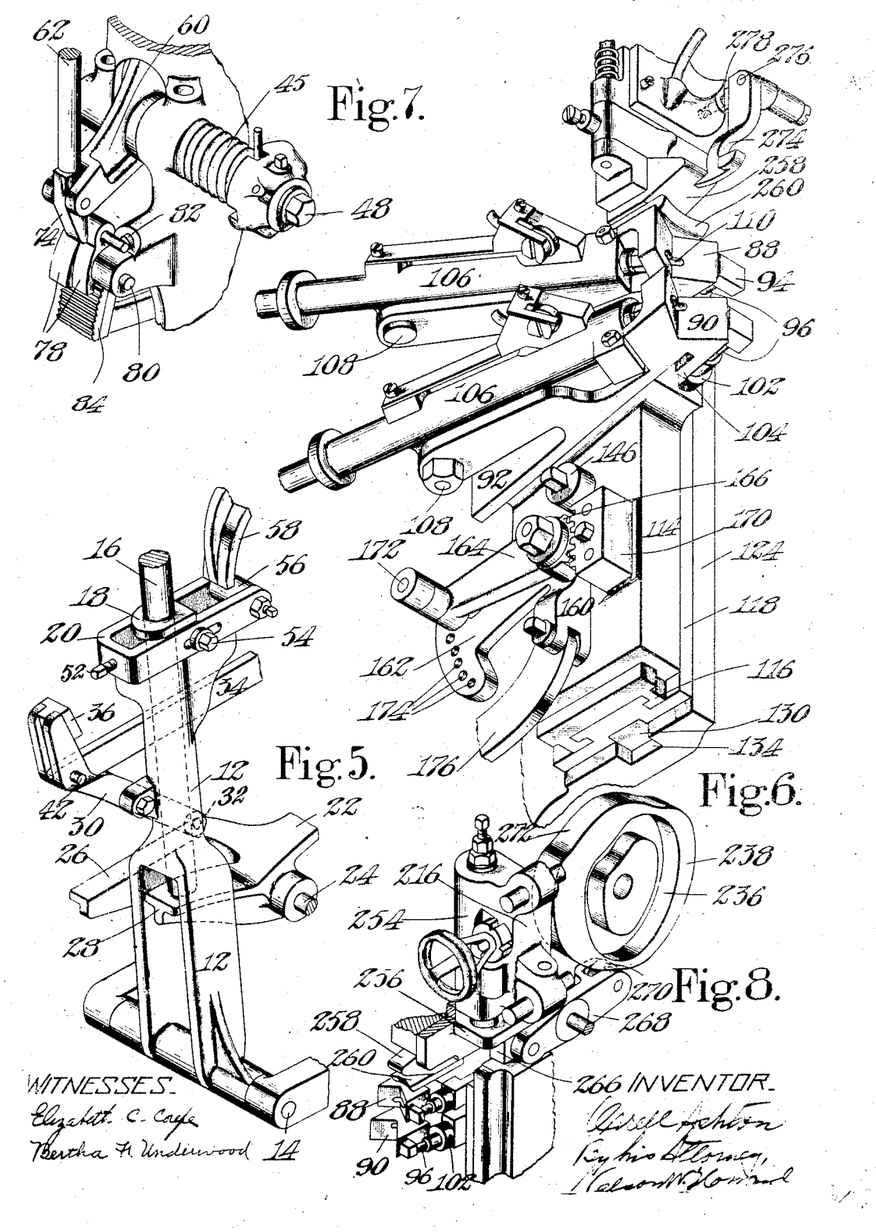
Fig. 5 is a perspective view of the lower portion of the jack.
Fig. 6 is a perspective view of the counter tacking mechanism.
Fig. 7 is a view showing a detail of the jack locking mechanism.
Fig. 8 is a perspective view showing details of the mechanism for operating the top wiper.

Referring now to the drawings: 10 indicates a suitable base or frame upon and in which the operating parts of the mechanism are mounted. At the front lower portion of the frame a jack support 12 is pivoted at 14 for movement toward and from the machine. The upper portion of the supporting member 12 is hollow to permit the passage therethrough of the lower end of the jack post 16, as shown in Fig. 5. A collar 18 is formed upon the jack post and is adapted to rest upon a frame 20 to limit the downward movement of the post in its support. The frame 20 is adjustably fitted to the upper end of the supporting member 12 in a manner to be described hereinafter.

Figure 2:
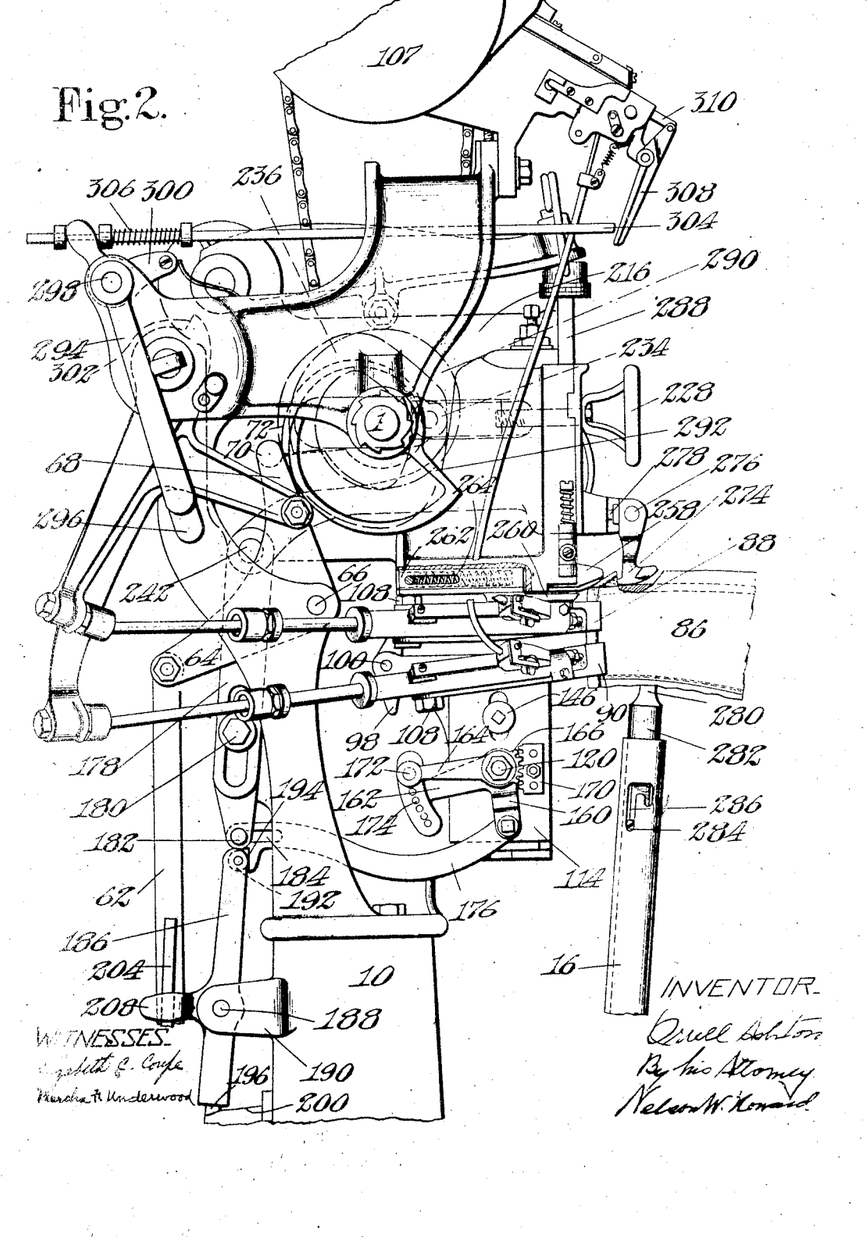
Fig. 2 is a view in elevation of the opposite side of the upper portion of the machine, with parts broken away.
Figure 4:
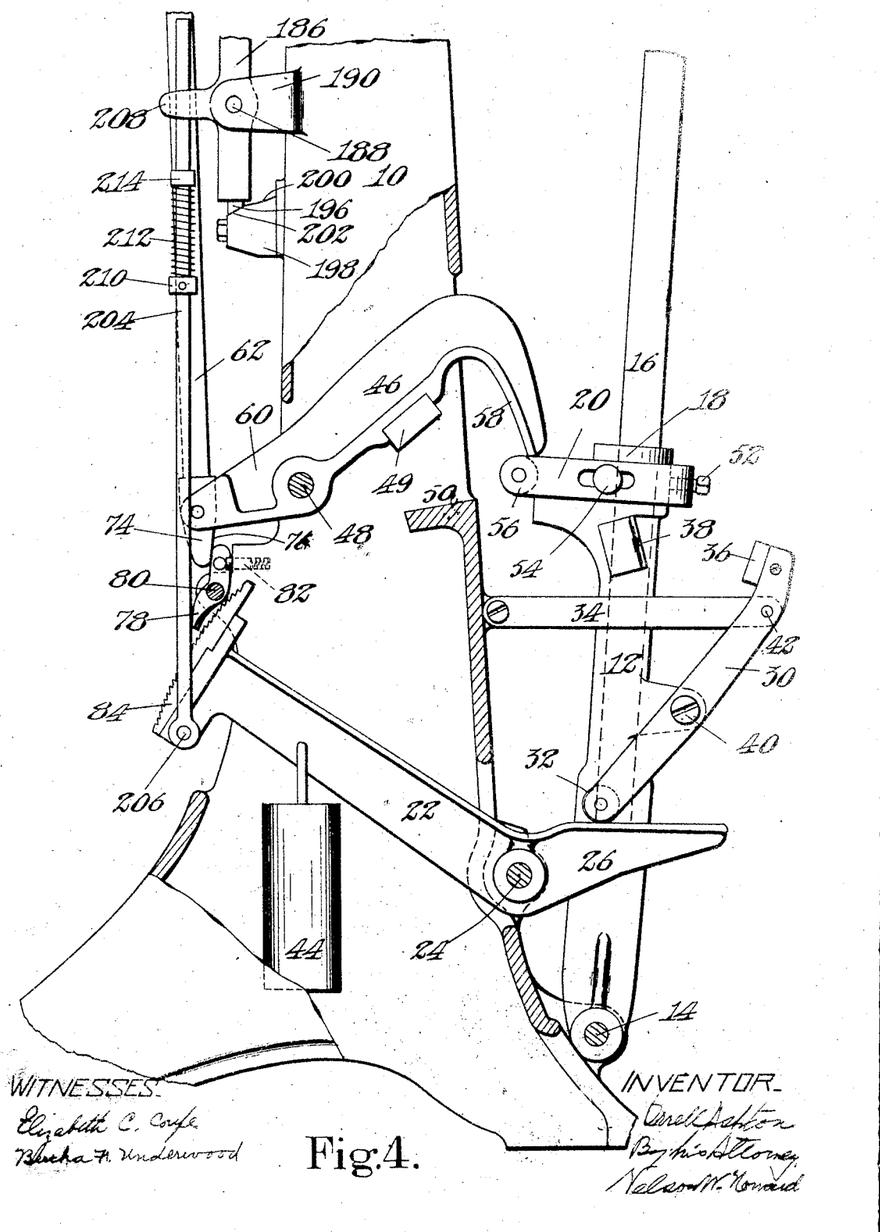
Fig. 4 is a view, partly in section, of the lower portion of the machine.

Referring now to Figs. 4 and 5, a lifting lever 22 is pivoted to the base 10 at a point 24 near the point 14 about which the jack turns. The forwardly projecting portion of the lever 22 is bifurcated as shown at 26, 28. The arm 28 is arranged for engagement with the lower end of the jack post 16 to elevate the latter in a manner to be described. A controlling lever 30 is pivoted between its ends to the member 12 and carries at its lower end a roll 32 which rides upon the upper face of the arm 26. The upper end of the controlling lever 30 is connected by a link 34 to the base 10. At the upper end of the lever 30 is also mounted a block 36 with which a stop 38 upon the member 12 is arranged to coöperate to limit the outward swinging movement of the jack. It will be apparent that as the jack is swung outward from the position shown in Fig. 4 the movement of the pivotal point 40 of the controlling lever 30 will cause the lever to swing about the point 42 as a center and, consequently, the roll 32 will also swing outward and downward. Inasmuch as the roll 32 is at this time in engagement with the arm 26 the latter will be depressed, lifting the weight 44 upon the inner arm of the lever 22, and permitting the jack post 16, the lower end of which rests upon the arm 28, to descend until the collar 18 rests on the frame 20. A hook 46 is pivoted in the frame 10 at a point 48 above the lever 22. The hook 46 is provided with a block 49 arranged for engagement with a stop surface 50 upon the frame 10 as a final limiting means for downward movement of the hook. A spring 45, Fig. 7, coiled about the pivot 48, tends to force the hook downward. The frame 20 is fitted to the top of the member 12 in a manner to permit forward and rearward adjustment by means of the adjusting screw 52 and is secured in adjusted position by the clamping bolt 54. At the rear end of the frame 20 is mounted an antifriction roll 56 and the hook 46 has formed upon it a cam face 58 adapted for operative engagement with the roll 56. The formation of the cam surface 58 is such that as the hook descends the roll 56 will be moved rearward and the jack will be drawn into the machine. The lever 46 projects rearward from the pivot 48 as represented at 60 and the rearward projection is connected by a rod 62 to a bell crank cam lever 64 pivoted at 66 to the machine frame. The upstanding arm 68 of the cam lever carries a roll 70 arranged for operative engagement with a cam 72 upon the main drive shaft 1 of the machine. The arrangement is such that when the machine is in its normal stopped position, as shown in Fig. 2, the roll 70 is on the highest part of the cam 72 and the connecting rod 62 is consequently depressed, raising the hook 46 to permit the jack to swing forward away from the machine. The lower end of the rod 62 carries a projection 74 having a cam face 76 arranged for engagement with the upper ends of a pair of pawls 78 which are pivoted at 80 on the machine frame. Spring pressed plungers 82 tend to press the lower ends of the pawls 78 into engagement with a segmental ratchet 84 upon the rear end of the lever 22. When the machine is in its stopped position the projection 74 engages and holds the pawls 78 out of engagement with the ratchet 84, permitting the lever 22 to be moved at will. When the jack is swung into position to bring the last 86 into coöperative relation to the operating parts of the machine, as shown in Fig. 2, the heel end of the shoe upper carried on the last engages and is definitely located by two V-shaped tack blocks 88, 90.

Figures 9, 10, 11, 12, 13, 14:
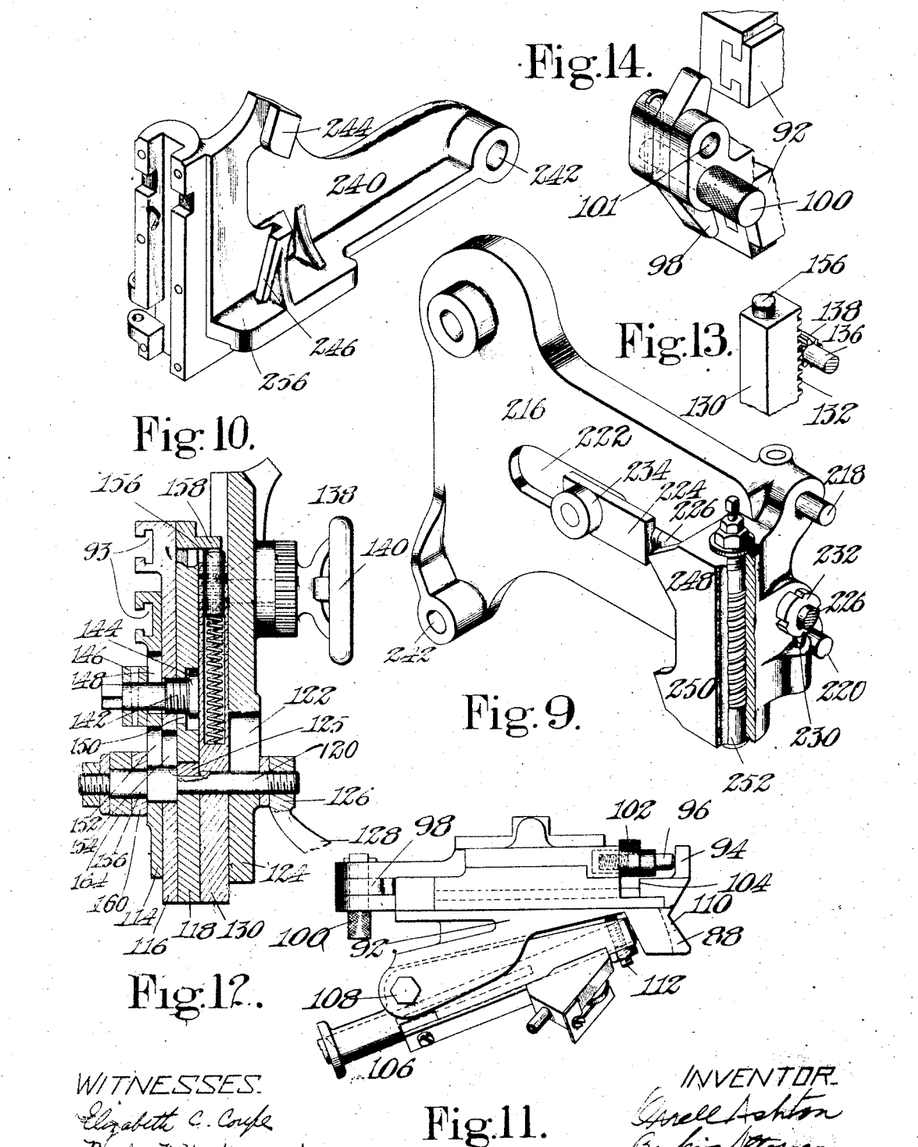
Fig. 9 is a view showing the reciprocable wiper carriage detached.
Fig. 10 is a view showing the oscillatory wiper carrier detached.
Fig. 11 is a plan view of part of the tacking mechanism.
Fig. 12 is a vertical sectional view of the slides which support the counter tack drivers.
Fig. 13 is a perspective view showing a detail of the mechanism illustrated in Fig. 12.
Fig. 14 is a detail perspective view of the equalizing lever and adjacent parts.

Referring to Fig. 11, each of the tack blocks forms part of a slide 92. The slides 92 are mounted for movement longitudinally in suitably formed guideways 93 (see Fig. 12). At the forward end of each slide 92 a laterally projecting lug 94 is arranged in coöperative relation to a spring pressed plug 96 which tends to move the slide and the tack block 88, forming a part thereof, forward. An equalizing lever 98, Fig. 14, is pivoted at 100, its ends being located to be engaged by the rear ends of the slides 92. By this arrangement the rear end of the shoe may be seated firmly in both V blocks, which automatically adjust themselves to the work, irrespective of the curvature of the rear end of the last. If it be not desired to utilize the automatic equalizing feature, rearward movement of one or both of the slides 92 may be prevented by turning the flat sided thumb nut 102 through part of a revolution to bring its rounded portion back of the shoulder 104 formed upon the slide 92. A tack driving mechanism 106 is secured to each of the slides 92 by a bolt 108 and receives fastenings from any suitable form of tack supplying device 107. For the purpose of adjusting the lateral position at which the tacks are driven into the work, the opening 110 in each of the V-blocks is transversely elongated. By loosening the bolt 108 and turning the adjusting screw 112, Fig. 11, adjustment of the tack driver about the bolt 108 as a center is permitted, after which the bolt may be tightened to hold the mechanism in its adjusted position. The lower V block 90 and its tack driver are carried by a vertically movable slide 114, Fig. 12. The slide 114 is connected by a T slot and guide to a vertically adjustable slide 116, which in turn is connected by a T slot and guide to a third slide 118. The upper V block 88 is carried by the intermediate slide 116. A clamping bolt 120 passes through all the sliding members and through a slot 122 in the wing 124 which forms a part of the frame of the machine. The bolt is held from rotation by a spline 125 located in a slot in the slide 118. A clamping nut 126 is integral with a hand lever 128 and the parts are so arranged that upon the nut 126 being tightened certain of the parts will be clamped together as will be described. A bar 130 having rack teeth 132, Fig. 13, upon its rear face is slidably arranged in a groove 134 in the wing 124 and rests in a corresponding groove in the slide 118, as clearly shown in Figs. 6 and 12. A shaft 136 has a pinion 138 upon its inner end and hand wheel 140 secured to its outer end. The pinion 138 meshes with the rack 132 and, since the shaft 136 is journaled in the wing 124 of the frame, rotation of the hand wheel will effect vertical adjustment of the rack bar 130. The bolt 120 acts as a dowel to prevent relative vertical movement between the slide 118 and the bar 130. The slide 118 therefore partakes of any vertical adjusting movement imparted to the rack-bar. A clamping screw 142 is threaded into the slide 116 and has formed upon its inner end a head 144. A collar 146 is pinned to the outer end of the screw, the space between the head and the collar being somewhat greater than the combined thickness of the slides 114, 116 and 118, as is clearly apparent in Fig. 12. The screw 142 passes through slots 148 and 150 in the slides 114 and 118, respectively.

By reason of the construction just described, rotation of the screw in one direction will cause its head 114 to clamp the slide 118 to the slide 116, while rotation of the screw in the opposite direction will cause the collar 146 to operate to clamp the slide 114 to the slide 116. Thus it will be seen that the intermediate slide 116 may be clamped to either of the other two slides as required. The slides 114 and 116 are slotted at 152 and 154 to permit the passage of the clamping bolt 120. A spring pressed plug 156 coöperating with a laterally projecting lug 158 upon the slide 116 yieldingly supports the latter from dropping when the clamping screw 142 is loosened.

At the left of the head of the bolt 120, as shown in Fig. 12, a reduced portion 156 of the bolt forms a bearing for a bell crank lever having a downwardly extending arm 160 and a rearwardly extending arm 162. The reduced portion 156 also provides a bearing for the lever 164, the shorter arm of which consists of a gear segment 166 which meshes with a rack block 170 mounted upon the slide 114. The longer arm of the lever 164 extends rearward and a spring pressed pin 172, Fig. 6, carried in the end of the lever is arranged to enter any one of a circular series of holes 174 in the arm 162, to provide for adjustment of the lever 164 relative thereto. A link 176, Fig. 2, connects the arm 160 to the lower end of a lever 178 which is movable about a vertically adjustable pivot 180. The connection between the lever 180 and the link 176 is effected by means of a pin 182 and slot 184 for the purpose of permitting a certain amount of lost motion for reasons to be explained later. An elevating lever 186 is pivoted at 188 in a bracket 190 upon the frame 10. A roll 192 at the upper end of the lever 186 bears upon a shoulder 194 at the rear end of the link 176. A spring pressed plug 196 in the lower end of the lever 186 bears upon a cam 198 having a face 200 concentric with the pivot 188 and an eccentric face 202. A rod 204 pivoted at 206 to the rear arm of the lever 22 passes loosely through an extension 208 on the lever 186. A collar 210 is secured upon the rod 204 and a spring 212 resting upon the collar 210 supports a loose collar 214. When the jack is drawn forward, away from the machine, the resulting elevation of the rear arm of the lever 22 raises the rod 204 until the collar 214 engages the projection 208, throwing the upper end of the lever 186 forward. This acts through the link 176 to swing the bell crank lever 160, 162 and through the rack and pinion connection 166, 170 to elevate the slide 114. When the lever 186 is in this position the plug 196 bears upon the eccentric face of the cam 198, thus yieldingly elevating the slide 114.

Figure 3:
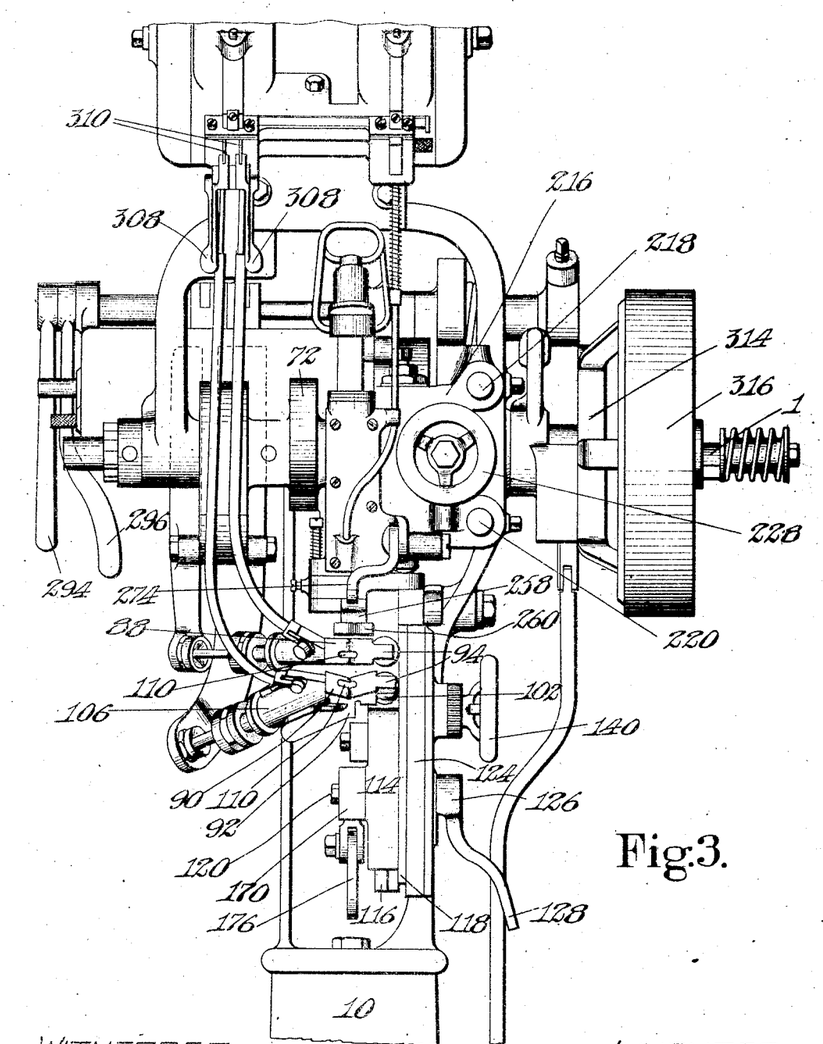
Fig. 3 is a view in front elevation of the upper portion of the machine.

A wiper carriage 216 is mounted for sliding movement upon the stationary bars 218, 220, Fig. 3. The carriage 216 is slotted at 222 (see Fig. 9) and a block 224 is mounted for adjustment in the slot 220 by means of a screw threaded rod 226 having a hand wheel 228 on its outer end. A spring pressed click 230 coöperates with a notched collar 232 upon the rod 226 to maintain the adjustment. A cam roll 234 upon the block 224 travels in a cam path 236 formed in the face of a cam 238, Fig. 8, secured to the main drive shaft 1.

A wiper carrier 240 is pivotally mounted at 242 upon the carriage 216. The lever 178 is also connected to the carriage 216 at 242, Fig. 2. Gibs 244, 246 upon the carrier 240 form an inter-locking connection with corresponding gibs 248, 250 on the carriage 216, permitting the carrier to oscillate about its pivot 242 while preventing lateral displacement of the carrier 240 relative to the carriage 216. A spring pressed plunger 252 mounted in a barrel 254 at the forward end of the carriage 216 bears upon a shelf 256 at the forward end of the carrier 240, pressing the carrier downward yieldingly. A wiper 258 is mounted upon the front end of the carrier 240. A back presser 260 is secured to a sliding block 262 and is held yieldingly toward the work by a spring 264 housed in the carrier 240. The under side of the shelf 256, Fig. 8, slides over a block 266 carried by one end of a centrally pivoted lever 268, the other end of which carries a cam roll 270 bearing upon a peripheral cam face 272 formed upon the cam 238. The cam 272 serves to control the lowering and raising of the wiper 258 into and out of engagement with the work. A stop 274, Fig. 2, is supported upon a pivot 276 carried by the wiper carrier 240 and is yieldingly maintained in vertical position by a spring pressed pin 278. The stop 274 serves to determine accurately the vertical location of the sole of the last. Although the jack is self adjusting through a considerable range of heights, some auxiliary means of adjustment is desirable to provide for extreme differences in the heights of lasts. This is done in the embodiment shown by forming the heel pin 280 upon a post 282 which is inserted in the upper tubular portion of the jack post 16. A screw or pin 284 rigidly secured in the post 282 rests in a slot 286 in the tubular portion of the jack post and permits adjustment of the post 282 to either one of two heights in a manner which will be clearly apparent from Fig. 2 of the drawings.

A tack driving mechanism 288 operates through the wiper 258 to drive a fastening through the work to secure the parts together and is operated in the usual manner by a cam 290 upon the main shaft 1. The tacking mechanisms 106, 106 are also operated in the ordinary and well known manner by a cam 292 upon the main shaft. Sometimes it is desirable to throw one or both of the counter tack drivers 106 out of operation, and provision has been made for this by pivoting hand levers 294, 296 at 298. Each of these levers has a bell crank arm 300 which, as the hand lever is moved rearward, swing behind a projection 302 upon the corresponding tacker operating cam lever whereby operation of the latter is prevented. At the same time a rod 304 is yieldingly moved forward through a spring 306 and actuates a finger 308 which moves a slide 310 into the throat of the tack raceway and stops the supply of fastenings. The starting and stopping of the machine is controlled by a treadle 312 connected to any desired form of one revolution clutch 314 which operates to connect and disconnect the continuously running pulley 316 to and from the driving shaft 1.

The operation of the machine heretofore described is as follows: The shoe parts, which usually comprise an insole and a lined upper having a counter inserted between the upper and lining, having been arranged upon a last, the last is placed upon the pin 280 and the jack is moved toward the machine until the heel portion of the shoe is seated in the V blocks 88, 90 which act as gages to locate the shoe accurately. As the jack moves inward the controlling lever 30 swings about its pivot 42, causing the roll 32 to be raised and permitting the weight 44 to descend. This causes the arm 28 of the lever 22 to rise, whereby the jack post is elevated yieldingly. When the parts have reached approximately the position shown in Fig. 4, the roll 32 leaves the lever arm 26 so that the weight 44 operates automatically to bring the work into engagement with the stop 274 irrespective of variations in the height of the last. The operator now actuates the treadle 312 to start the machine. The cam roll 70 first drops off the shoulder of the cam 72 whereupon the spring 45 swings the hook 46 about the pivot 48. The cam 58 coöperates with the cam roll 56 to draw the work firmly into the V blocks which automatically adapt themselves to the contour of the heel end of the last by reason of the equalizing lever connection 98. If the lower V block has any tendency to drag the upper downward on the last, the pin 100 may be placed in the upper hole 101, Fig. 14, making the lower arm of the equalizing lever 98 longer than the upper arm, with the result that the stationary V block 88 will exert considerably more pressure upon the work than the wiper block 90, and will hold the work securely to the last during the operation of the said wiper block. As the rod 62, which is connected to the rear end of the hook 46, rises, the projection 74 is disengaged from the pawls 78, one of which engages a tooth of the ratchet 84 to lock the jack against depression. The wiper carriage 216 now starts forward, the wiper 258 engaging the edge of the upper and wiping the upper, counter and lining over the edge of the last. The spring pressed plunger 252 permits the wiper carrier 240 to yield upward so that the wiper may ride up over the edge of the last. At this time the pin 182 is at the rear end of the slot 184, the link 176 being held forward and the weight of the slide 114 and the parts carried thereby being sustained by the spring pressed plug 196 bearing upon the eccentric cam surface 202. The link 176 is moved rearward, simultaneously with the forward movement of the wiper, through the lever 178 which is connected at 242 to the wiper carriage. Assuming the slides 116 and 118 to be clamped together, rearward movement of the link 176 operates through the rack and pinion mechanism heretofore described to lower the slide 114 which carries the lower V block 90 while the upper V block 88, upon the slide 116, remains stationary. The block 90 at this time performs a wiping action upon the shoe upper in a direction opposite to the direction of action of the wiper 258, with the result that the upper is stretched tightly and smoothly over the heel of the last. Since the wiper carrier rises somewhat when the wiper passes over the edge of the last, the stop 274 moves away from the work. As the wiper moves forward, the presser 260 presses against the rear face of the upper and assists in forming a well defined edge at the heel. When the wiper 258 has reached the forward limit of its movement the tacker 288 operates to drive a fastening into the work. The driving mechanisms 190, if not cut out, also operate at this point to drive one or more tacks into the face of the upper. During further rotation of the driving shaft the cam 272 causes the block 266 to be raised, elevating the wiper 258 until it is out of contact with the work, whereupon the wiper 258 returns, being maintained in its elevated position until it has reached the rear limit of its stroke. During the return stroke of the wiper the pin 182 moves forward in the slot 184. The plug 196 at this time bears upon the concentric cam surface 200 and has no tendency to move the link 176 forward. The cam 72 now causes the rod 62 to descend, raising the hook 46 and unlocking the pawls 78 to permit the jack to be drawn away from the machine and lowered. As the jack is drawn forward the lever 22 is raised and through the rod 204 and spring 212 the link 176 is moved forward and the lower V block 90 is raised to its original position. This taking place after the shoe has been removed from the block, there is no danger of the tack being disturbed or the work being marred by upward movement of the block in contact with it. At the end of the return movement of the wiper, the cam 272 permits it to descend, so that it is in its initial position when the machine stops.

Figure 1:
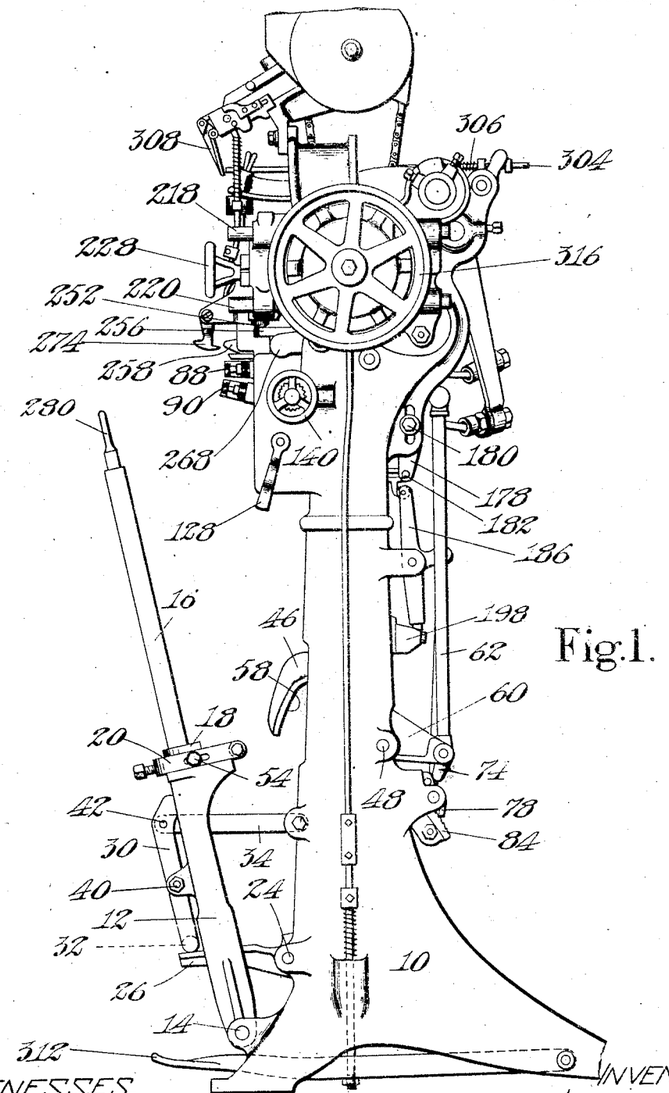
Figure 1 is a view of the machine in side elevation.

Adjustment of the height at which the upper tack is driven into the counter may be effected after loosening the clamping nut 126 by rotation of the hand wheel 140 which, through the rack and pinion 132, 138, will raise or lower the rack bar 130. The slide 118 will partake of the movement of the bar 130 as will the slide 116 which is clamped to the slide 118 by the screw 142. The parts described are secured in adjusted position by tightening the clamping nut 126. If it be desired to adjust the spacing between the upper and lower tack blocks 88, 90 this may be done by inserting the pin 172 in different holes 174 whereby the vertical adjustment of the slide 114 relative to the bell crank lever 162 is changed. The length of stroke of the lower tack block 90 may be varied by vertical adjustment of the fulcrum 180 which is mounted in a slot in the machine frame for that purpose, as is shown clearly in Fig. 1. Since the stroke of the wiper carriage, and the pivot 242 carried thereby, is constant, variation in the position of the fulcrum 180 will vary the stroke of the pin 182 and, consequently, the stroke of the tack block 90. In case it be desired to move both blocks 88, 90 downward to effect a wiping operation the slide 116 may be secured to the slide 114 by turning the screw 142 in the opposite direction from that previously described, whereupon the slide 116 will be released from the slide 118 and the V blocks 88, 90 will move together, such movement being permitted by the slotted connections 150, 152, 154. Sometimes it may be desirable to dispense with the equalizing movement of the tack blocks 88, 90. For example, when operating upon small shoes it may be convenient to use only one of the said tack blocks. Provision has, therefore, been made for preventing equalizing movement of the blocks by turning the thumb nut 102 until it rests back of the shoulder 104 and prevents its corresponding block from yielding rearward. When it is desired to adjust the position laterally of the shoe at which the tack is to be driven into the face of the shoe in order, for example, to avoid a seam, the bolt 108 is loosened and the adjusting screw 112 manipulated until the desired adjustment is secured after which the bolt 108 is tightened to maintain the adjustment.

Figure 15:
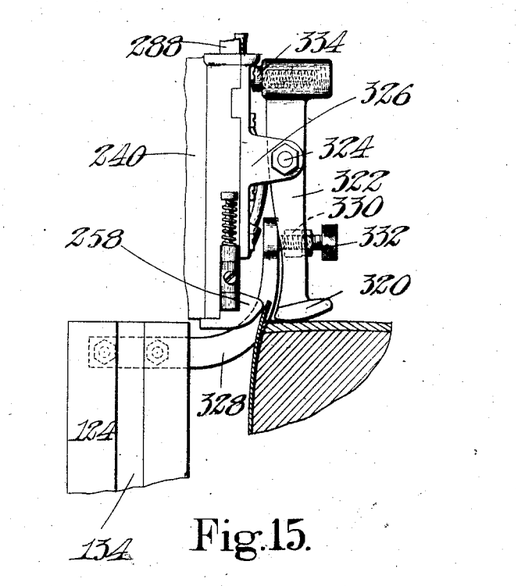
Fig. 15 is a view, in side elevation, of a modified form of wiper.
Figure 16:
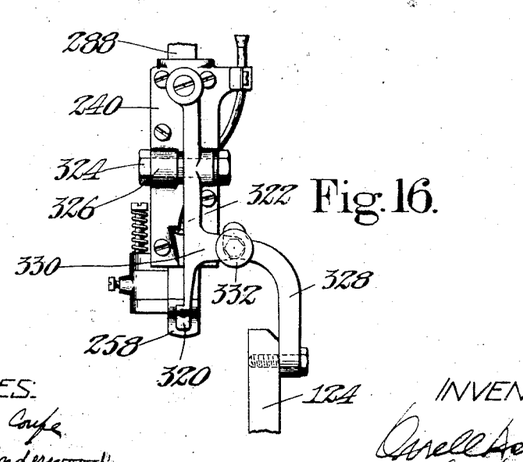
Fig. 16 is a front view of the mechanism shown in Fig. 15.

Instead of constructing the stop 274 as described, a construction such as illustrated in Figs. 15 and 16 may be employed. A combined stop and gripper jaw 320 is carried at the lower end of a gripper lever 322. The lever 322 is pivotally supported at 324 in a bracket 326 carried by the wiper carrier 240. A forwardly and upwardly extending stationary arm 328 is bolted to the portion 124 of the machine frame. A lug 330, projecting laterally from the gripper arm 322 has a thumb screw 332 threaded into it. The upstanding end of the arm 328 is so located that, when the machine is at rest and the screw 332 properly adjusted, the gripper jaw 320 will be held a short distance away from the nose of the wiper 258. A spring pressed pin 334, bearing against the front of the carrier 240 tends always to move the jaw 320 toward the wiper 258.

In use the work is located against the jaw 320 as a stop, in the manner previously described, the upwardly projecting edge of the upper being inserted between the wiper 258 and the gripper jaw 320. As the wiper carrier 240 moves forward, after the machine is started, the spring pressed pin 334 keeps the point of the screw 332 against the stationary arm 328. Since the pivot 324 is moving forward, the jaw 320 will move backward toward the advancing wiper 258. The wiper and the jaw 320 thus form a gripper, which seizes the upper at about the time that the advancing wiper comes into engagement with it. Further advance of the carrier 240 causes the screw to leave the stop arm 328 and the edge of the upper is held in the gripper by the tension of the spring behind the pin 334. The upper is drawn tightly against the last, being tensioned both by the advance of the gripper and by the action of the wiper 258 which forms one jaw of the gripper. During the final portion of the advance of the gripper and wiper mechanism the jaw 320 may slip off the work, which is at that time held securely by the downward pressure of the wiper. The return movement of the mechanism just described is effected in the same manner as heretofore set forth.

Having described the invention fully, what is claimed as new and desired to be secured by Letters Patent is:—

1. In a machine of the class described, the combination of a last supporting jack, a stationary, V-shaped block arranged to receive and locate the rear end of a shoe which is upon its last, a forwardly movable wiper constructed and arranged to wipe the edge of the shoe upper over the edge of the last, means for securing the wiped-over upper to an insole mounted upon the last, a V-shaped tack block mounted for vertical movement in engagement with the rear end of the shoe, means for moving the tack block away from said wiper simultaneously with the forward movement of the wiper, whereby the upper is drawn simultaneously in opposite directions, and means acting through said tack block for securing the upper to the rear end of the last at the end of the movement of the tack block.

2. In a machine of the class described, the combination of a stationary, V-shaped gage arranged to receive and locate the end of a shoe upon a last, wiping and tacking means for wiping the edge of the shoe upper over the edge of a sole upon the last and securing the upper to the sole, and wiping and tacking mechanism operable simultaneously with the said means for tensioning the upper toward the cone of the last and securing the tensioned upper to the last.

3. In a machine of the class described, the combination of a gage arranged to be engaged by a shoe upon a last, a wiper arranged to wipe the edge of the shoe upper over the edge of a sole upon the last, a fastening device for securing the upper to the sole, wiping mechanism operating toward the cone of the last simultaneously with the action of the said wiper, and a fastening device for securing the upper to the last.

4. In a machine of the class described, the combination of means for supporting a last, means for laying the edge of a shoe upper over the edge of a sole upon the last and securing the upper to the sole, and means for wiping the upper toward the cone of the last and securing it to the last in the condition produced by the wiping operation.

5. In a machine of the class described, the combination of means for locating a last, means for drawing the edge of a shoe upper over the edge of a sole upon the last and securing the upper to the sole, and means for drawing the upper toward the cone of the last and securing it to the last to hold the drawn upper from retraction.

6. In a machine of the class described, the combination of means for supporting an upper and a sole upon the last, means acting toward the sole and against the last to place the upper under tension, means acting in an opposite direction to place the upper under tension, and operating mechanism connected with said last mentioned two means for actuating them in timed relation to do their work.

7. In a machine of the class described, the combination of means for supporting an upper and a sole upon the last, and means for tensioning the upper in a direction away from the sole and holding the upper to the last to prevent its retraction.

8. In a machine of the class described, the combination of a device for tensioning an upper over a last bottom, a device acting against the side face of the last in a direction away from the last bottom to tension the upper, and means for operating said devices simultaneously to do their work.

9. In a machine of the class described, the combination of a plurality of devices for tensioning an upper over a last, said devices being constructed and arranged for movement in a direction substantially perpendicular to each other, and means for operating said devices to do their work by moving the devices away from each other.

10. In a machine of the class described, the combination of a plurality of wiping devices for working an upper over a last, one of said devices being constructed and arranged for movement in a substantially horizontal plane, and the other constructed and arranged for movement in a vertical plane, and means for operating said devices simultaneously to do their work.

11. In a machine of the class described, the combination of means for operating on a shoe, two vertically arranged slides, V-blocks mounted on the slides and arranged to engage the rear part of the shoe to locate the shoe relatively to the operating means, means for varying the vertical position of the slides relatively to each other and of both slides relatively to the operating means.

12. In a machine of the class described, the combination of a gage mounted for slight longitudinal movement, said gage being otherwise stationary, a wiping device constructed and arranged for slight longitudinal movement and for transverse wiping movement, and equalizing mechanism connecting the gage and the wiping device arranged to exert upon the work through the gage a pressure different from that exerted upon the work through the wiper.

13. In a machine of the class described, the combination of a gage mounted for slight longitudinal movement, said gage being otherwise stationary, a wiping device constructed and arranged for slight longitudinal movement and for transverse wiping movement, and equalizing mechanism connecting the gage and the wiping device arranged to exert upon the work through the gage a pressure greater than that exerted upon the work through the wiper.

14. In a machine of the class described, the combination of a work support, a work gage against which the vertical face of a shoe may be located, a wiping member constructed and arranged for engagement with the said face, equalizing connections between the gage and the member to permit the shoe to engage both, irrespective of its shape, and means for pressing the shoe toward said gage and member.

15. In a machine of the class described, the combination of means for operating upon a boot or shoe, a stop adapted for engagement with the work to locate the work vertically relatively to the operating means, a work support movable substantially horizontally toward and from the operating means, and means becoming operative automatically as an incident to the said horizontal movement and effecting elevation of the work support to raise the work into engagement with the stop.

16. In a machine of the class described, the combination of a tool for operating upon a boot or shoe, a stop adapted for engagement with the work to locate the work vertically relatively to the tool, a work support movable toward and from the tool, and yielding means becoming operative automatically as an incident to the movement of the work toward the tool and effecting elevation of the work toward the stop.

17. In a machine of the class described, the combination of a wiper for operating upon a boot or shoe, power operated mechanism for actuating the wiper, a work support movable toward and from the wiper, means for raising the work support which is rendered effective automatically as the support is moved toward the wiper, and power controlled locking means for securing the work support in raised position during operation of the wiper upon the work.

18. In a machine of the class described, the combination of a wiper movable horizontally over a shoe bottom, a shoe support movable to carry a shoe toward the wiper, a cam member, and power operated mechanism to advance the wiper over the shoe and to actuate the cam member to lock the shoe support against horizontal displacement by the action of the wiper on the shoe.

19. In a machine of the class described, the combination of a reciprocating block having a wiping face on its lower side, a jack for holding a shoe to receive the action of said wiping face, a roll on the jack, and a hook on the machine frame operating when the machine starts to lock the jack against movement in response to the wiping thrust of the block.

20. In a machine of the class described, the combination of a tool, a work support manually movable horizontally toward the tool and movable vertically toward the tool, a hook having a cam face arranged for engagement with the work support to lock it against horizontal movement, and means rendered effective by movement of the hook for locking the support against vertical movement, and power mechanism for operating the hook.

21. In a machine of the class described, the combination with a reciprocating block having a wiping face on its lower side, of vertically and horizontally movable means for supporting a shoe to receive the action of said wiping face, means for lifting the work support, a ratchet and pawl for locking the work support against depression, and a hook for engaging the work support to lock the work support against horizontal movement by the reciprocating wiper and causing interengagement of the ratchet and pawl to lock the support vertically.

22. In a machine of the class described, the combination of means for operating upon a boot or shoe, a stop adapted for engagement with the work to locate the work vertically relatively to the operating means, a work support movable substantially horizontally toward and from the operating means, a lifting lever pivoted to the frame between its ends and having a ratchet segment on one end and the other end arranged to engage the work support, means rendered effective by horizontal movement of the work support for operating the lifting lever to raise the work support toward the stop, and means operating when the machine starts to engage the segment and lock the jack in elevated position.

23. In a machine of the class described, the combination of means for operating upon a boot or shoe, a stop adapted for engagement with the work to locate the work vertically relatively to the operating means, a work support movable substantially horizontally toward and from the operating means, a lifting lever pivoted to the frame with one end engaging the work support, means for yieldingly actuating the lever to raise the work support, and a controlling lever operated by the horizontal movement of the work support to take the thrust of the lifting lever until the work support is under the stop and then permitting the lifting lever to raise the work support to bring the work into engagement with the stop.

24. In a machine of the class described, the combination of a tool for operating upon a boot or shoe, a work support movable horizontally toward the tool, a lifting lever operating to raise the work support toward the tool, mechanism connected with the work support acting to permit the lever to raise the work support only when the support is horizontally adjacent to the tool, and means acting automatically when the machine starts for locking the lever against movement to lower the support during the operation of the tool.

25. In a machine of the class described, the combination of a tool, a work support manually movable toward the tool, a hook having a cam face arranged for engagement with the work support, driving mechanism for the tool, and connections from the driving mechanism to cause the cam face of the hook to engage the work support, draw the work support toward the tool and lock it in operative relation to the tool.

26. In a machine of the class described, the combination of a reciprocating wiper carriage, power means for reciprocating the carriage forwardly once in each cycle of the machine, a wiper carrier pivotally mounted upon the carriage, and a wiper upon the carrier.

27. In a machine of the class described, the combination of a reciprocating wiper carriage, a wiper carrier pivotally mounted upon the carriage, a wiper upon the carrier and a spring interposed between the carriage and the carrier for forcing the wiper yieldingly toward the work.

28. In a machine of the class described, the combination of a carriage, a wiper carrier movably mounted upon the carriage, a shelf upon the carrier and a spring mounted upon the carriage and bearing upon the shelf for depressing the wiper carrier yieldingly.

29. In a machine of the class described, the combination of a wiping device, a work support movable toward and from the wiping device, means for actuating said device to effect a wiping movement, and means under control of the work support for returning the wiping device to its initial position.

30. In a machine of the class described, the combination of a wiping device, a work support between which and the wiping device there is a relative movement of approach and separation, means for actuating said device to effect a wiping movement, and separate means arranged to return the wiping device to its initial position only after the movement of separation has been effected and the work has been moved out of engagement with said device.

31. In a machine of the class described, the combination of a wiping device, a work support movable toward and from the wiping device, means for actuating said device to effect a wiping movement, and means operated by the later portion of the movement of the work support away from the wiping device for returning the wiping device to initial position.

32. In a machine of the class described, the combination of a wiper, means for advancing the wiper, a jack movable toward and from the wiper, and means controlled by the jack for retracting the wiper.

33. In a machine of the class described, the combination of a wiping device, means for advancing the device with a wiping movement, a jack movable toward and from the device, and mechanism connected to the jack for retracting the device after the work has been moved away therefrom.

34. In a machine for working an upper over a last, a wiper, a shoe support movable toward and from the plane of operation of the wiper, means for imparting to the wiper a wiping movement, and operative connections with the shoe support for retracting the wiper after the movement of the shoe support with the shoe away from the wiping plane.

35. In a machine for working an upper over a last, a wiper, a shoe support movable toward and from the plane of operation of the wiper, means to impart to the wiper a wiping movement, and operative connections with the shoe support for retracting the wiper automatically when the shoe support has been moved away from the wiping plane to relieve contact of the wiper with the work.

36. In a machine for working an upper over a last, a wiper movable in contact with an upper on the last at the rear end of the shoe in a direction away from the sole, a support for moving the shoe into and out of contact with said wiper, and operative connections for imparting return movement of the wiper toward the plane of the sole only after the shoe support has carried the shoe away from the wiper.

37. In a machine of the class described, the combination of a wiper, power means for imparting operative movement to the wiper, automatic means for securing in place the material operated upon by the wiper, and means under the control of the operator for returning the wiper to inoperative position.

38. In a machine of the class described, the combination of a wiper, power means for advancing the wiper, means for supporting the wiper in its advanced position, a jack movable toward and from the wiper, and operative connections between the jack and the wiper for retracting the wiper by movement of the jack away from it.

39. In a machine of the class described, the combination of a wiper, power means for advancing the wiper, means for holding the wiper in its advance position, a jack movable toward and from the wiper, a lifting rod, lever connections between the lifting rod and the jack to lift the rod when the jack is moved toward the wiper, and mechanism between the lifting rod and the wiper for retracting the wiper.

40. In a machine for working an upper over a last, a wiper having an operative movement in contact with the upper on the last at the rear end face of the shoe in a direction away from the sole, a support for the last, means for effecting relative movement between the wiper and the support to bring the upper on the last and the wipers into and out of contact, means for operating the wiper to do its work, and operative connections for returning the wiper only after relative movement of separation has occurred between the wiper and the support.

41. In a machine of the class described, the combination of a horizontally movable wiper carriage, a wiper carrier and wiper connected with the carriage, a power actuated cam for moving the carriage, and means for varying the position of the carriage relatively to the cam to control the amount of movement of the wiper relatively to the work.

42. In a machine of the class described, the combination of a wiper carriage movable horizontally to and from position over a shoe bottom, a wiper carrier pivoted to the rear portion of the carriage, means between the carriage and the carrier for yieldingly forcing the carrier toward the work, a wiper on the carrier, a stop for locating the work vertically relatively to the wiper, power means for advancing and retracting the carriage, and means for raising the wiper clear of the work prior to its retractive movement.

43. In a machine of the class described, the combination with means for sustaining a shoe, of a wiper having a rounded forward end and a long upwardly inclined lower wiping face, a presser having a concaved shoe engaging face for engaging the convex surface of the end portion of the shoe below the wiper, and means for operating the wiper and presser to do their work.

44. In a machine of the class described, the combination of a shoe support, a wiper carrier, a wiper having a beveled acting face and mounted on the carrier and adapted to wipe an upper over the edge of the bottom of a last sustained upon the shoe support, a carriage in which the wiper carrier can yield upwardly as the wiper wipes over the edge of the work, and a presser yieldingly mounted upon the vertically yielding wiper carrier in position to engage the upper on the side of the last directly under the wiper and to partake of the vertical movement of the wiper carrier.

45. In a machine of the class described, the combination of a shoe support, a wiper carrier, a wiper mounted upon the carrier and adapted to wipe over the edge of an upper sustained upon the shoe support, and a presser yieldingly mounted upon the wiper carrier and adapted to engage the face of said upper.

46. In a machine of the class described, the combination of a horizontally movable stop against which a shoe bottom may be rested to determine its vertical position and having a face for engagement with the shoe upper, a wiper having an upper gripping face and mounted for reciprocation to and fro over the shoe bottom, means for yieldingly forcing the stop toward the wiper, a stop arm for holding the stop away from the wiper when the wiper is in retracted position to permit the insertion of the upper between the gripping face of the wiper and the coöperating upper engaging face on the stop, power means for giving operative movements to the wiper whereby the upper is seized between the wiper and the stop to tension the upper and lay the same over the shoe bottom, and means for fastening the upper in place.

47. In a machine of the class described the combination with a work support of combined upper seizing and upper wiping means comprising a member formed to wipe over upon the heel seat the upstanding margin of upper at the heel, a spring actuated jaw coöperating with one face of the wiper member to form a gripper, and means for holding the gripper normally open and permitting it to close when the shoe and the wiping means are moved relatively, whereby the upper is seized and placed under tension by a continuation of said relative movement.

48. In a machine of the class described, the combination of wiping means, means actuated upon movement of the wiping means for seizing the upstanding margin of the upper at the heel, means for holding the upper against the last at the back of the heel, and means for applying tension to the held portion of upper, said wiping means acting to wipe the upper down upon the heel seat while it is held by the tensioning means and holding means.

49. In a machine of the class described, the combination of wiping means, means rendered effective by movement of the wiping means for seizing the upstanding margin of upper at the heel portion of a shoe, means for holding the upper against the last at the back of the shoe, and means for tensioning forwardly the seized portion of upper.

50. In a machine of the class described, the combination of a reciprocating wiper, means located in front of the wiper and adapted to coöperate with the end face of the wiper in seizing the flange of an upper projecting above the wiping plane, and operating mechanism constructed and arranged to effect relative separation of said wiper and seizing means for permitting insertion of the upper when the wiper is retracted and to effect seizing of the upper and pulling of the upper ahead of the wiping face of the wiper as the wiper is advanced.

51. In a machine of the class described, the combination of a reciprocating wiper, means located in front of the wiper and adapted to coöperate with the end face of the wiper in seizing the flange of an upper projecting above the wiping plane, operating mechanism to advance and retract the wiper, a spring to press the seizing means toward the wiper for gripping the upper, and a stop to arrest the seizing means during the retraction of the wiper whereby relative separation of the wiper and seizing means is effected to permit insertion of the upper.

52. In a machine of the class described, the combination of means for seizing a portion of upper projecting beyond the plane of the heel seat and tensioning the same, means for preventing displacement of the upper relatively to the last, and a wiper to act on the tensioned upper to force it, while under tension, against the back of the last and down upon the heel seat and adapted to withdraw the stock from the tensioning means while the latter is still in operative position.

53. In a machine of the class described, the combination of a shoe support, a wiping member movable relatively to the shoe support over the heel seat of the last, a lever resiliently held toward the forward face of said wiping member and adapted to form therewith a gripper, and means for normally holding the gripper member separated from the wiping member to permit introduction of the work, said means permitting the gripper to close when the wiping member is operated relatively to the shoe.

54. In a machine of the class described, the combination of means for supporting a last with an upper assembled thereon, means for holding the upper adjacent to the sole of the last, and means coöperating with the last for tensioning the upper by movement in a direction away from the sole of the last and toward the cone of the last.

55. In a machine of the class described, the combination of means for supporting a last having an upper assembled thereon, means for holding the upper against the last at the edge of the last bottom, means operating between the sole and the cone of the last for tensioning the upper in a direction away from the sole of the last, and means for securing the upper at both ends of the tensioned portion.

56. In a machine of the class described, the combination of a plurality of devices arranged to coöperate for tensioning an upper, one acting to lay the upper over upon the sole and the other acting to tension the upper away from the sole, and mechanism for actuating said devices in timed relation to do their work.

57. In a machine of the class described, the combination of a plurality of devices arranged to coöperate for tensioning an upper, one acting to lay the upper over upon the sole and the other acting to tension the upper away from the sole, and securing means coöperating with each of said devices to fasten the upper in place.

58. In a machine of the class described, the combination of a plurality of devices arranged to coöperate for tensioning an upper, one acting to lay the upper over upon the sole and the other acting to tension the upper away from the sole, and means for varying the operative movements of said devices.

In testimony whereof I have signed my name to this specification in the presence of two subscribing witnesses.

ORRELL ASHTON.

Witnesses:
JAMES O. WRIGHT,
O. BLANCHE HARGRAVES.